3,157,657
CATALYTIC SYNTHESIS OF TRIETHYLENE-DIAMINE

Walter H. Brader, Jr., Austin, Tex., assignor to Jefferson Chemical Company, Inc., Houston, Tex., a corporation of Delaware
No Drawing. Filed Oct. 21, 1963, Ser. No. 317,778
6 Claims. (Cl. 260—268)

This invention relates to a method for the production of C-substituted heterocyclic compounds. More particularly, this invention relates to the production of C-substituted diazabicyclo-(2.2.2)-octanes, hereinafter referred to as C-substituted triethylenediamines.

Alumina is a well-known material which is widely used in the gamma form when it is desirable to have a substantially completely inert material present during a chemical conversion, since it is one of the most chemically inert materials that is known. This is true not only of the general field of chemistry, but also true of the more restricted field of heterocyclic amine chemistry. Thus, aluminas have been proposed as supports for the hydrogenation catalysts for the production of heterocyclic compounds such as morpholine and piperazine and their N-substituted and C-substituted derivatives.

However, and in contrast to the general teaching of the art, it has now been discovered that alumina is an effective catalyst for the conversion of N-aminoethyl and N-hydroxyethyl C-substituted piperazines to the corresponding mono-C-substituted triethylenediamines.

The starting material for the present invention is a compound of the formula:

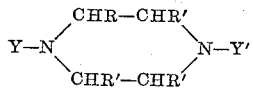

Wherein R is selected from the group consisting of $C_1$ to $C_4$ alkyl;
Wherein R' is selected from the group consisting of H and $C_1$ to $C_4$ alkyl;
Wherein Y is selected from the group consisting of hydrogen and —$CH_2$—$CH_2$—X; and
Wherein X is amino or hydroxy, with the proviso that at least one of Y is —$CH_2$—$CH_2$—X.

Examples of suitable feed stocks include

N-hydroxyethyl-3-methylpiperazine,
N-hydroxyethyl-3-ethylpiperazine,
N-hydroxyethyl-3-propylpiperazine,
N-hydroxyethyl-3-butylpiperazine,
N-hydroxyethyl-3-isobutylpiperazine,
the corresponding
N-hydroxyethyl-2-alkylpiperazine,
N-hydroxyethyl-2,5-dimethylpiperazine,
N-hydroxyethyl-2,3,5,6-tetramethylpiperazine,
N-hydroxyethyl-2,5-diethylpiperazine,
N-hydroxyethyl-2,3,5-trimethylpiperazine,
N-hydroxyethyl-2,5-dipropylpiperazine,
N,N'-dihydroxyethyl-2-methylpiperazine,
N,N'-dihydroxyethyl-2-ethylpiperazine,
N,N'-dihydroxyethyl-2-butylpiperazine,
N,N'-dihydroxyethyl-2,5-dimethylpiperazine,
N,N'-dihydroxyethyl-2,5-diethylpiperazine, etc.,
other corresponding N-aminoethyl- compounds such as
N-aminoethyl-2-methylpiperazine,
N-aminoethyl-3-methylpiperazine,
N-aminoethyl-2-ethylpiperazine,
N-aminoethyl-2,5-dimethylpiperazine,
N-aminoethyl-2,3,5,6-tetramethylpiperazine,
N-aminoethyl-2,5-diethylpiperazine,
N,N'-diaminoethyl-2-methylpiperazine,
N,N'-diaminoethyl - 2,5 - diethylpiperazine, and mixtures thereof. The N-hydroxyethyl feed stocks are prepared with comparative ease by reacting ethylene oxide with the desired C-substituted piperazine. Suitably, an excess of ethylene oxide is employed, in which case the product will be either a mixture of the mono-N-hydroxyethyl derivative with the di-N,N'-hydroxyethyl derivative or will be composed principally of the N,N'-dihydroxyethyl derivative.

The catalyst to be employed in accordance with the present invention is an alumina, such as alpha alumina, beta alumina, gamma alumina, eta alumina, etc. Synthetic gamma alumina is preferred because of its purity and high surface area in its commercial forms.

In accordance with one embodiment of the present invention, the reaction is conducted in the presence of from about 1 to about 15 mols of ammonia per mol of piperazine-type feed material, as above defined. More preferably, from about 3 to about 10 mols of ammonia per mol of feed material are employed.

Other feed components that may also be employed, if desired, include water and hydrogen. Water may constitute from about 5 to about 75 wt. percent of the total liquid feed material, when it is employed, and the hydrogen is suitably employed in an amount which constitutes a partial pressure of from about 1% to about 50% of the total pressure of the system.

The reaction is preferably conducted at atmospheric pressure and in the vapor phase, although subatmospheric or superatmospheric pressures may be employed if desired.

The reaction temperature is preferably within the range of about 200° to about 600° C. and, still more preferably, is a temperature within the range from about 250° to about 550° C. such as a temperature within the range of about 270° to about 550° C. Contact time, as measured in terms of space velocity, may suitably be within the range from about 0.1 to about 1 gram of piperazine-type feed material per gram of catalyst per hour. A suitable flow rate for the ammonia is also within the range from about 0.1 to about 0.5 gram of ammonia per gram of catalyst per hour. Hydrogen and water flow rates are adjusted correspondingly in the manner known to those skilled in the art.

The invention will be further illustrated by the following specific examples which are given by way of illustration and not as limitations on the scope of this invention.

Example 1

Methyl triethylenediamine was prepared by the cyclization of N-hydroxyethyl-3-methylpiperazine over a gamma alumina catalyst in a reaction carried out in a cylindrical shaped stainless steel reactor fitted with a jacket containing a polyphenyl heat exchange medium for temperature control and an appropriate charge of gamma alumina. The reaction procedure involved pumping the N-hydroxyethyl-3-methylpiperazine at a weight/hourly/space velocity of about 0.35 and metering in ammonia at a weight/hourly/space velocity of about 0.1 into the top of the reactor which was maintained at atmospheric pressure. The reactor contains about 100 milliliters of gamma alumina catalyst, the remainder of the reactor space containing Beryl Saddles. The reactor effluent which passed from the bottom of the reactor was collected and distilled. The fraction boiling above 100° C. to about 200° C. was taken as product and a higher boiling fraction was then taken under vacuum to insure recovery of unreacted feed. The fractions were then examined by vapor phase chromatography for constituent analysis.

The temperature employed for the run in question was about 406° C. and the flow rates included a flow rate of 0.31 gram of N-hydroxyethyl-3-methylpiperazine per hour and about 0.2 gram of ammonia per hour per pound of catalyst.

On analysis it was found that the reaction was essentially complete and that the yield of C-methyl triethylenediamine was about 29 wt. percent.

When N-aminoethyl-3-methylpiperazine is substituted as a feed material and the reaction is carried out in essentially the manner described above, equivalent results are obtained and a significant quantity of C-methyl triethylenediamine is obtained.

*Example II*

Repeat Example I but utilize N-aminoethylpiperazine as a feed stock, a temperature of about 360° C., a pressure of about 115 millimeters of mercury, a feed rate of about 1.30 grams of N-aminoethylpiperazine per gram of catalyst per hour. In a run conducted in this fashion, the yield of triethylenediamine, based on the N-aminoethyl feed material was only about 2.5 wt. percent.

When the example was repeated at a higher temperature of about 410° C., the yield of triethylene diamine, based on the N-aminoethylpiperazine, was still only about 4.2 wt. percent.

As can be seen from the foregoing, therefore, gamma alumina has poor catalytic activity for the preparation of unsubstituted triethylene diamine from unsubstituted feed stocks such as N-aminoethylpiperazine or hydroxyethylpiperazine. It is further seen from the above results that gamma alumina is a good catalyst for the conversion of a C-substituted hydroxyethyl or aminoethylpiperazine to the corresponding C-substituted triethylenediamine.

Having thus described my invention, what is claimed is:

1. A method for preparing a C-substituted triethylenediamine which comprises contacting an ethylenic compound with alumina at a temperature within the range of about 200° to about 600° C. to form the corresponding C-substituted triethylenediamine, said ethylenic compound having the formula:

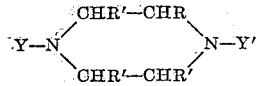

Wherein R is selected from the group consisting of $C_1$ to $C_4$ alkyl;
Wherein R' is selected from the group consisting of H and R;
Wherein Y is —$CH_2$—$CH_2$—X;
Wherein Y' is selected from the group consisting of H and Y; and
Wherein X is selected from the group consisting of —OH and —$NH_2$.

2. A method as in claim 1 wherein the feed stock is N-hydroxyethyl-3-methylpiperazine.

3. A method as in claim 1 wherein the feed stock is N-aminoethyl-3-methylpiperazine.

4. A method for preparing a C-substituted triethylenediamine which comprises the steps of contacting an ethylenic compound with gamma alumina at a temperature within the range from about 250° to about 500° C. in the added presence of from about 1 to about 15 mols of ammonia per mol of ethylenic compound and recovering a C-substituted triethylenediamine from the products of the reaction, said ethylenic compound having the formula:

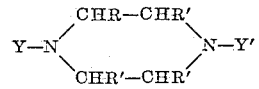

Wherein R is selected from the group consisting of $C_1$–$C_4$ alkyl;
Wherein R' is selected from the group consisting of H and R;
Wherein Y is —$CH_2CH_2X$;
Wherein Y' is selected from the group consisting of H and Y; and
Wherein X is selected from the group consisting of —OH and —$NH_2$.

5. A method as in claim 4 wherein the compound is N-hydroxyethyl-3-methylpiperazine.

6. A method as in claim 4 wherein the compound is N-aminoethyl-3-methylpiperazine.

No references cited.